United States Patent
Muramori et al.

(10) Patent No.: US 8,228,334 B2
(45) Date of Patent: Jul. 24, 2012

(54) IMAGE PROCESSING METHOD

(75) Inventors: Masashi Muramori, Kanagawa (JP); Daisaku Ikejiri, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1219 days.

(21) Appl. No.: 10/164,304

(22) Filed: Jun. 6, 2002

(65) Prior Publication Data

US 2002/0196263 A1    Dec. 26, 2002

(30) Foreign Application Priority Data

Jun. 20, 2001  (JP) ................................ 2001-186163
Mar. 6, 2002   (JP) ................................ 2002-059985

(51) Int. Cl.
   *G06T 13/00* (2011.01)
(52) U.S. Cl. ...................................... 345/473
(58) Field of Classification Search ................. 345/418, 345/419, 430, 473, 582, 636, 672, 723, 804, 345/961, 970, 974, 784; 395/161; 273/85; 463/31, 3; 434/252, 307 R
   See application file for complete search history.

(56) References Cited

U.S. PATENT DOCUMENTS

| | | | | |
|---|---|---|---|---|
| 4,504,055 | A * | 3/1985 | Wells | 463/3 |
| 5,146,557 | A * | 9/1992 | Yamrom et al. | 345/723 |
| 5,841,441 | A * | 11/1998 | Smith | 345/587 |
| 6,137,492 | A * | 10/2000 | Hoppe | 345/420 |
| 6,217,444 | B1 | 4/2001 | Kataoka et al. | |
| 6,227,973 | B1 | 5/2001 | Kikuchi | |
| 6,277,973 | B1 | 8/2001 | Jenkins et al. | |
| 7,789,742 | B1 * | 9/2010 | Murdock et al. | 463/3 |

FOREIGN PATENT DOCUMENTS

| | | |
|---|---|---|
| EP | 0 454 129 | 10/1991 |
| EP | 0 807 903 | 11/1997 |

* cited by examiner

*Primary Examiner* — Amare Mengistu
*Assistant Examiner* — Aaron M Guertin
(74) *Attorney, Agent, or Firm* — Katten Muchin Rosenman LLP (57) ABSTRACT

An object surface is rendered by not only grid lines indicating a slope in the surface of an object, but also by moving objects which move over the object surface with a speed responsive to the slope angle on the object surface, thereby enabling a player to refer to the grid lines and to the movement of a moving object, so as to visually perceive minute slopes and bumps in the object surface.

4 Claims, 7 Drawing Sheets

IMAGE PROCESSING METHOD

This application is related to Japanese Patent Application No. 2001-186163 filed on Jun. 20, 2001 and No. 2002-059985 filed on Mar. 6, 2002, based on which this application claims priority under the Paris Convention and the contents of which are incorporated herein by reference.

BACKGROUND OF THE INVENTION

1. Field of the Invention

The present invention relates to an image processing program suitable for application to processing for rendering an object image having slopes and bumps on a two-dimensional monitor screen, such as the case of a green in a golf game, a computer-readable recording medium having stored therein the image processing program, an image processing method, and an image processing apparatus.

2. Description of the Related Art

In the past, various video games have been provided in which a player can operate a character in a virtual space created by executing a game program.

In these games, for example, the ground upon which a character stands is often modeled by a flat object, which has no slopes or bumps, and rendered two-dimensionally on a monitor apparatus. This is done because in modeling the ground so that it has slopes and bumps, it is necessary to perform a large amount of additional calculations corresponding to the variation in the slopes or bumps of the ground surface, for example collision analysis (contact judgment) of contact area between the character and ground surface and analysis of the movement of the character in response to the variation in the shape of the ground surface, thereby placing a large load on an image processing apparatus such as a video game machine or personal computer that executes the game program.

In recent years, however, with an increase in the processing speed of processors, there has been a rapid improvement in the processing capability of image processing apparatuses, thereby enabling undulation processing, in which a ground surface having slopes and bumps is modeled and rendered, and various real-time processing accompanied by applying of undulation processing. For example, in a golf game, it has become possible to render a green having many and varied slopes and bumps on a monitor apparatus.

Until now, however, although image processing apparatuses have progress to the point at which they can render slopes and bumps using undulation processing, for example, the rendering of a reproduction of the rolling of a golf ball as it follows the slopes and bumps on a green, even when applying undulation processing, because the rendering is done two-dimensionally on a monitor apparatus, it is extremely difficult for a player to visually perceive the condition of a green having such minute and delicate slopes and bumps that it is close to being flat. For this reason, in the case in which a plurality of players are playing a golf game using one monitor apparatus, the actual ground surface condition perceived by a player will depend on the player's seating position.

One method that can be envisioned for solving this problem associated with rendering processing using undulation processing is that, for example, renders on an object surface grid lines formed by joining vertices of a polygon group that forms the object, the spacing between and number of these grid lines being used to cause a player to perceive fine variations in slope or bumps. The term "polygon" used here is the smallest graphical unit making up an object, and is for example a triangle, a rectangle or other polygon.

However, although the above-noted type of grid lines can be used to cause a player to perceive relatively large slopes and bumps in the ground surface via a monitor apparatus, it is difficult with grid lines alone to cause perception of tiny slopes and bumps, for example, on a surface that is substantially flat, because the spacing and number of nearby grid lines is substantially the same.

In a golf game for example to which the above-noted undulation processing is not applied, it can be envisioned that slopes and bumps can be expressed by mapping the turf particles on the green, with the rolling direction of a golf ball being forcibly decided based on this turf particles, in this case because the above-noted image processing apparatus is not applied to undulation processing, it is not possible to reproduce the condition of rolling of the golf ball over minute slops of the green.

SUMMARY OF THE INVENTION

Accordingly, in consideration of the above-noted problems, it is an object of the present invention to provide an image processing method, an image processing apparatus, and an image processing program and a computer-readable storage medium having recorded therein the image processing program, all of which are capable of visual perception of the condition of minute slopes and bumps in the ground surface on a monitor apparatus.

According to the present invention, the condition of a slope on an object surface onto the object surface is rendered using grid lines representing the condition. A moving object is rendered moving along the object surface at a speed responsive to the angle of slope of the object surface on which grid lines are plotted.

As the moving object is used above, the object has, for example, a texture applied to a particle or each of the polygons forming an object which is moving over the grid lines, and in the case in which the moving object is a particle operated on the grid lines, at a location at which the slope of the surface is large, the particle is rendered as moving at a high speed in the slope direction, while at a location at which the slope of the surface is slight, the movement is at a slow speed in the direction of the slope.

According to the present invention configured as noted above, a player refers to the movement of a moving object operated responsive to the slope and slope direction, and can easily perceive in a visual manner the condition of minute slopes and bumps in the object surface via a monitor apparatus.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Embodiments of the present invention are described below, with references made to accompanying drawings. The present invention can be applied to an entertainment apparatus that runs a golf game in which a player operates a character appearing on a virtual golf course rendered on a monitor apparatus.

Configuration of the Entertainment System

The configuration of an entertainment apparatus according to an embodiment of the present invention is described below, with reference being made to FIG. 1.

Figure 1:
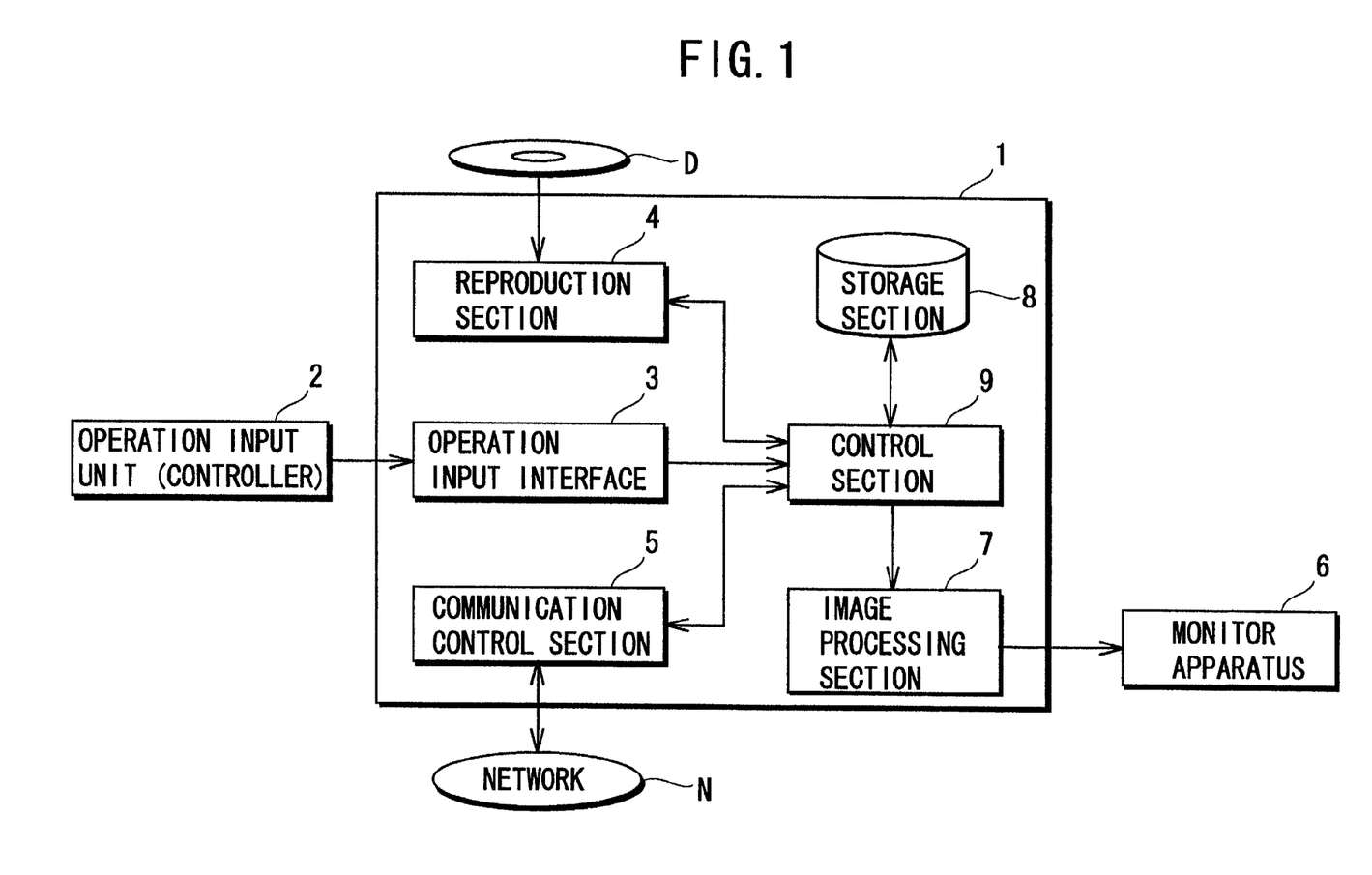
FIG. 1 is a schematic representation showing the configuration of an entertainment apparatus according to an embodiment of the present invention.

The entertainment apparatus 1 according to an embodiment of the present invention, as shown in FIG. 1, has an operation input interface 3 connected to a operation input unit (hereinafter referred to as a controller) 2 operated by a player, a reproduction section 4 into which is installed a storage medium D such as a CD-ROM or DVD, a communication control section 5 connected to a network N such as the Internet, a monitor apparatus 6, an image processing section 7 connected to the monitor apparatus 6, a storage section 8, which stores various digital data, and a control section 9, which controls the operation of the above-noted elements.

The controller 2 has direction keys and various buttons for enabling a player to play golf by operating a character within the golf game. When a player operates a direction key or various buttons, the controller 2 generates an operation input signal responsive to the type of operation, and outputs the operation input signal to the operation input interface 3.

The operation input interface 3 converts the operation input signal from the controller 2 to data format that can be processed by the control section 9, and outputs the converted data to the control section 9.

The reproduction section 4 has a disk installation mechanism into which the storage medium D is installed, and a reproduction mechanism, which reads out digital data stored within the storage medium D. When installation of the storage medium D is detected, the reproduction section 4 reads out digital data stored in the storage medium D, converts the digital data to a data format that can be processed by the control section 9, and outputs the converted data to the control section 9. The reproduction section 4, in accordance with a data readout command output from the control section 9, reads out the digital data in the storage medium D specified by the command and outputs the digital data to the control section 9.

In this embodiment, the storage medium D minimally has stored therein a golf game program, for example, information with regard to object images such as a character or the shape of the ground on a golf course.

It will be understood that the storage medium D is not restricted to a CD-ROM, and can alternatively be, for example, a flexible, disk, a hard disk, a CD-R, PD (Photo Disc), an MD, a MO disk, a DVD-ROM, a DVD-RAM, a DVD-RW, a ROM cartridge, or a RAM memory cartridge or the like.

The communication control section 5 is a communication device such as a modem or a terminal adaptor, provided with a communication protocol suitable for communication protocol used by the network N, such as the TCP/IP (Transmission Control Protocol/Internet Protocol). The communication control section 5 performs transmission and receiving of various information, using a communication protocol, with other communication devices connected to the network N. The various information received by the communication control section 5 is stored in the storage section 8 in response to a control signal from the control section 9. The information stored in the storage section 8 is read out by the control section 9 as required.

In this embodiment, the communication control section 5 is built into the entertainment apparatus 1, and the entertainment apparatus 1 is configured so as to be directly connected to the network N. It is alternatively possible, for example, to make a connection between an electronic device having a data communication function, such as a portable telephone or personal digital assistant (PDA) and the entertainment apparatus 1, and to connect the entertainment apparatus 1 to the network N via this electronic device.

The monitor apparatus 6 is a television apparatus in the case of the usual home game machine, a computer display apparatus in the case of a personal computer or a workstation, and a game display unit in the case of a commercial-use game machine. The monitor apparatus 6 displays golf game image data output from the image processing section 7 on a display screen.

The image processing section 7, in accordance with a control signal from the control section 9 which operates under the control of a golf game program, generates and sends to the monitor apparatus 6 various golf game image data, including polygon group making up an object image, textures (raw materials) applied to each polygon and grid lines plotted on the surface of an object.

The control section 9 is configured so as to be able to access other constituent elements within the entertainment apparatus 1. When the power supply of the entertainment apparatus 1 is switched on, the control section 9 executes an initialization program stored within the storage section 8, thereby performing an overall initialization of the apparatus. The control section 9 executes a golf game program stored in the storage medium D and controls the operation of other constituent elements in accordance with the golf game program. The control section 9, in accordance with the golf game program, reads out polygon data and texture data stored in the storage medium D, and outputs the read-out data to the image processing section 7.

Thus, the above-noted entertainment apparatus 1 executes a golf game program stored in the storage medium D, and performs processing responsive to operation control signals from the control section 9, enabling a player to play the golf game by operating a character within a virtual space via the controller 2.

Operation of the Entertainment Apparatus

The above-noted entertainment apparatus 1, in order to enable easy visual perception of the shape of a green or a fairway or the like over which a golf ball rolls when the player plays the golf game, applies undulation processing to object surfaces forming the ground surface, and plots not only grid lines on this object surface, but also a particle which move along the grid lines at a speed responsive to the degree of bump or slope on the ground surface. The operation of the entertainment apparatus 1 when processing is executed, is described with reference made to FIG. 2.

Figure 2:
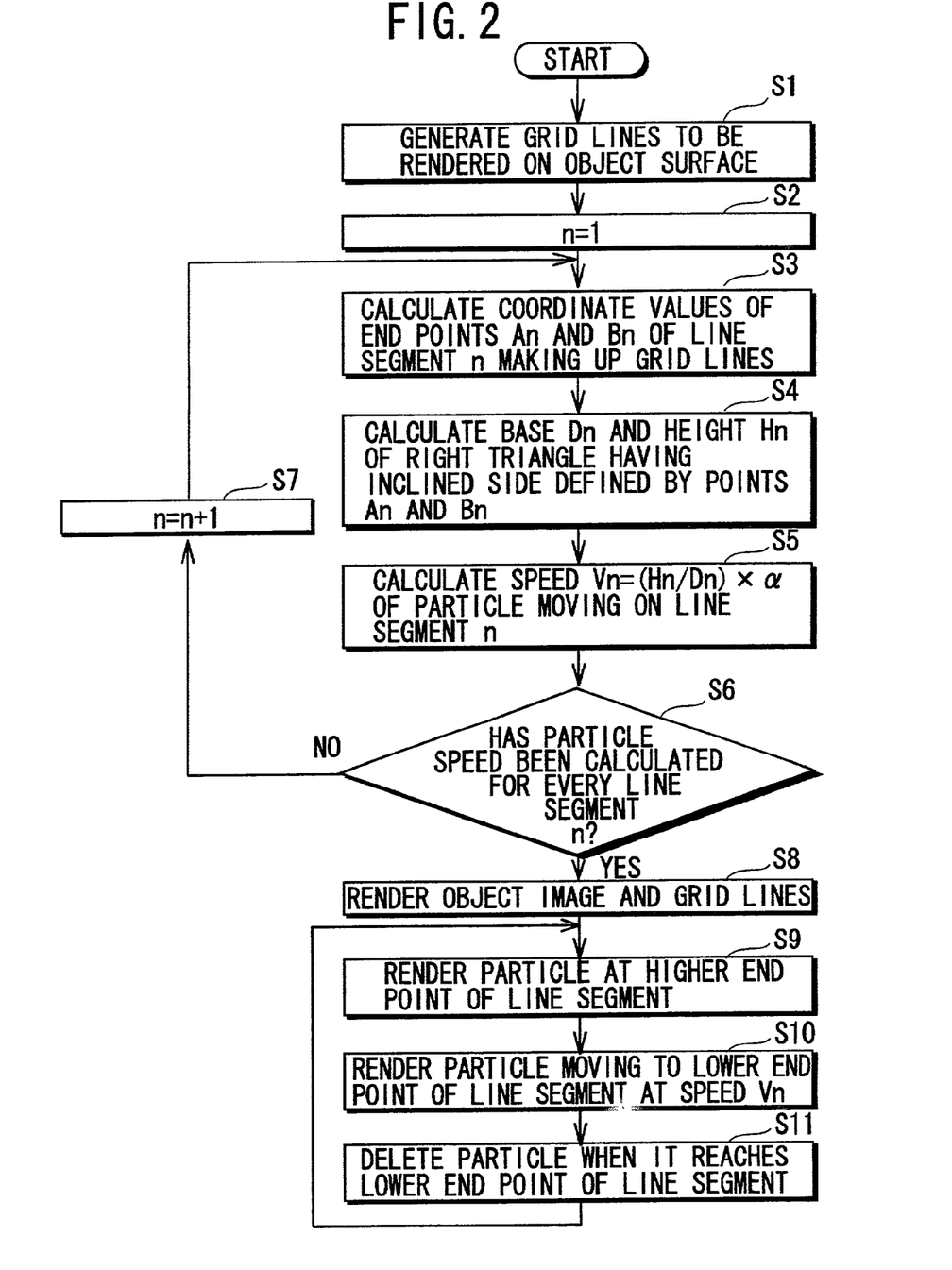
FIG. 2 is a flowchart showing the operation of the entertainment apparatus of FIG. 1.

The processing shown in the flowchart of FIG. 2 starts with the loading of the golf game program and object information stored in the storage medium D by the control section 9, and the operation of the controller 2 by the player to start playing of the golf game, whereupon the image processing section 7, based on the golf game program, and in response to control signals from the control section 9, executes the processing of the following steps S1 to S11.

At the processing of step S1, the image processing section 7, based on an operation input signal from the controller 2 in response to an operation thereof by the player, judges the direction in which the player wishes to strike the golf ball. The image processing section 7 generates the object that forms the ground shape in the direction that the player will make his or her shot, and the grid lines for rendering the surface of the object. This completes the processing of step S1, at which point the image processing transitions from the processing of step S1 to the processing of step S2.

Figure 3:
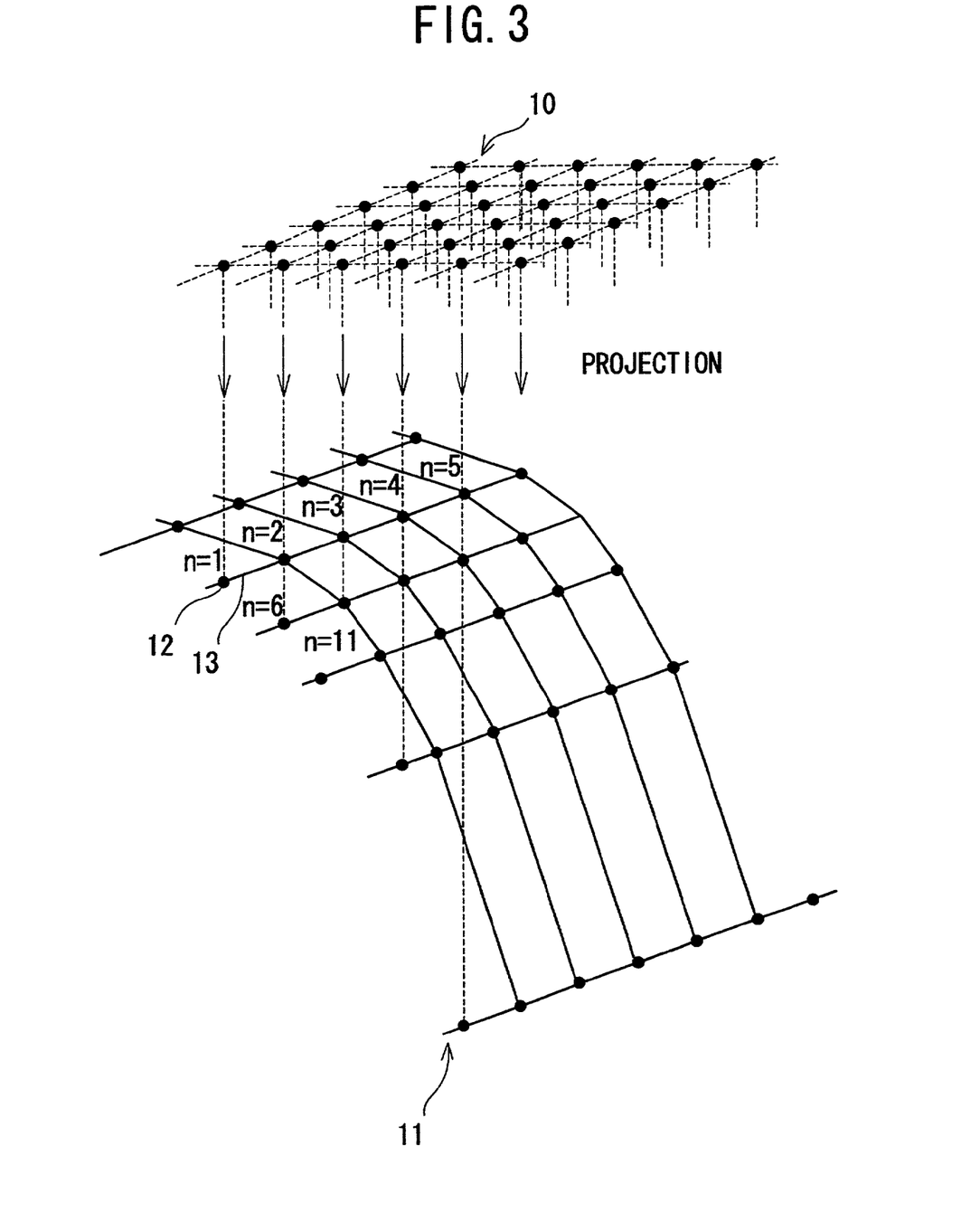
FIG. 3 is a schematic representation illustrating the method of generating grid lines according to the embodiment of the present invention.

At this point, the above-noted grid lines, as shown in FIG. 3, are generated by projecting the point group 10 displaced at uniform intervals directly above the polygon group forming the object onto the object surface 11, and joining the project point group 12 by line segments 13, and then assigning numbers n to each of the line segments making up the grid lines.

Because the above-noted grid lines have a high density at locations with a high slope and conversely have a low density at locations having a small slope, a player can grasp the general shape of the object surface from the number and spacing of the grid lines.

If the spacing of the grid lines 13 that are generated is excessively narrow because of a closely spaced group of points 10, the object surface will fill up with the grid lines 13, so that the grid lines are actually a hindrance, preventing a player from judging the shape of the object. On the other hand, if the placement of the point group 10 is made too wide, the grid lines will be sparse, making it impossible for the player to judge minute slopes and bumps on the object surface between the grid lines. It is thus desirable that the spacing of the point group 10 be of an appropriate size that does not hinder the judgment of the slope and bumps on the object surface. In this embodiment, as is noted below, the image processing section 7 places particles on each of the line segments 13 making up the grid lines, and performs control of the movement of these particles.

As the processing of step S2, in order for the image processing section 7 to execute successive processing for the line segments 13 forming the grid lines, a value of a program counter used to count the line segment numbers is set to 1. This completes the processing of step S2, whereupon the image processing transitions from the processing of step S2 to the processing of S3.

Figure 4:
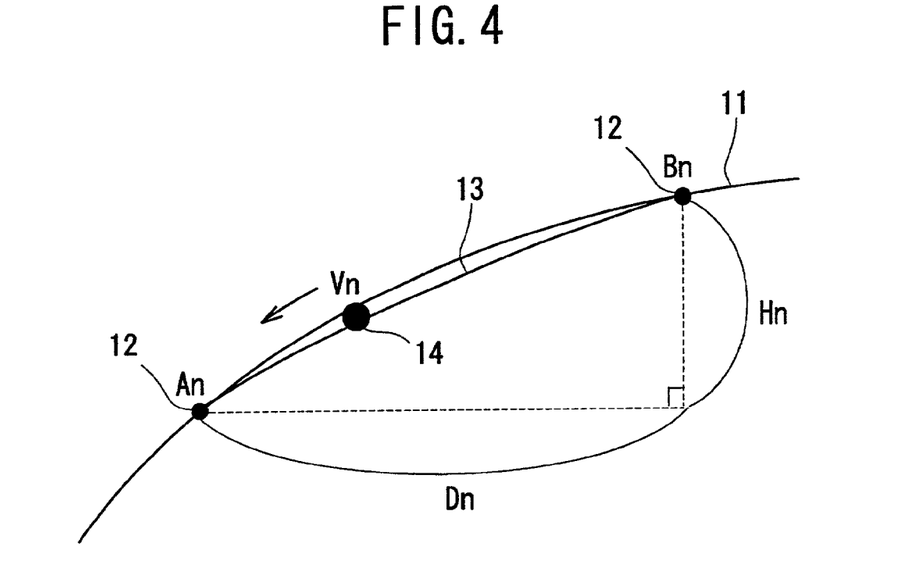
FIG. 4 is a schematic representation illustrating a method of establishing the movement speed of a particle according to the embodiment of the present invention.

As the processing of step S3, the image processing section 7 extracts from the line segments of the grid lines generated by the processing of step S1 the line segment n of the grid lines corresponding to the program counter value n. Then, as shown in FIG. 4, the image processing section 7 calculates the coordinate values of the end points An and Bn of the line segment n. In this example, the end point Bn is at a higher position than the end point An. This completes the processing of step S3 at which point transition is made from the processing of step S3 to the processing of step S4.

As the processing of step S4, the image processing section 7 uses the coordinate values of the end points An and Bn, as shown in FIG. 4, to calculate the base Dn and the height Hn of a right triangle having the line segment n as an inclined side. This completes the processing of step S4, at which point transition is made from the processing of step S4 to the processing of step S5.

As the processing of step S5, the image processing section 7 calculates the speed Vn of a particle 14 moving on the line segment n, based on the values of the base Dn and the height Hn calculated in the processing of step S4. This completes the processing of step S5, at which point transition is made from the processing of step S5 to the processing of step S6.

In this embodiment, the speed Vn of the above-noted particle 14 is calculated by Equation (1).

$$Vn = (\text{Height } Hn/\text{Base } Dn) \times \alpha \qquad (1)$$

In the above, $\alpha$ is an arbitrary real value that is set beforehand in the golf game program. In Equation (1), if there is no height difference between end point An and end point Bn, so that the height Hn is 0, the image processing section 7 calculates the speed Vn as 0, and processing for steps S9 and thereafter is not performed. It will be understood that the particle speed Vn, rather than being calculated by the above-noted Equation (1), can alternatively be calculated in relation to the height Hn alone.

According to Equation (1), the speed Vn of a particle 14 moving on the line segment n varies in proportion to the difference in height between the end points An and Bn. The result of this is that, for example, in the case in which the speed of a particle 14 moving on line segment n is faster than that of a particle moving on other line segments, the player judges that the height difference at the location of line segment n is greater than the height difference at another location, or conversely in the case in which the speed of a particle 14 moving on a line segment n is slower than that of a particle moving on other line segments, the player judges that the height difference at the location of line segment n is smaller than the height difference at another location, enabling a visual judgment to be made of the degree of the slopes and bumps on the ground surface based on the speed of the particle 14 as observed on the monitor apparatus 6.

As the processing of step S6, the image processing section 7 makes a judgment as to whether or not the processing of steps S3 through S5 has been performed for all the line segments. If the result of this judgment is that processing has not yet been performed for all the line segments, the image processing proceeds to step S7.

As the processing of step S7, the image processing section 7 increments the value of the program counter n by 1 and selects a new line segment. This completes the processing of step S7 at which point the image processing returns from the processing of step S7 to the processing of step S3.

If the result of the judgment is that all line segments have been subjected to the processing of step S3 through step S5, however, transition is made from the processing of step S6 to the processing of step S8.

As the processing of step S8, the image processing section 7 renders on the monitor apparatus 6 the object and the grid lines displayed on the object surface generated by the processing of step S1. This completes the processing of step S8, at which point image processing transitions from step S8 to step S9.

As the processing of step S9, the image processing section 7 renders the particles 14 at the higher end points of each line segment (in the foregoing example, at the end point Bn) This completes the processing of step S9, at which point the image processing transitions from step S9 to step S10.

As the processing for step S10, the image processing section 7 renders n particles 14 moving at a speed of Vn from a higher end point to a lower end point (in the foregoing example, to the end point An). This completes the processing of step S10, at which point the image processing transitions from step S10 to step S11.

As the processing of step S1, the image processing section 7 causes a particle 14 that reaches the lower end point to disappear. This completes the processing of step S1, at which point the image processing returns to the processing of step S9.

Thus, in the entertainment apparatus 1 according to this embodiment of the present invention, because the image processing section 7 repeatedly executes the processing of step S9 to step S11, thereby rendering the image as if a particle 14 was flowing from a high location to a low location on a line segment, the player playing the golf game can accurately perceive the shape of the location at which he or she is playing golf on the monitor apparatus 6, based on the grid line spacing and the movement of the particles 14 on the grid lines.

It will be understood that, rather than the above-noted particles 14, textures applied to each polygon forming the object can be caused to move so as to render the degree of slope or bump at the position of the polygons. In this case, the vectors are calculated from the heights of the vertices making up the polygons, and part or all of the texture applied to the polygons is caused to move in accordance with the calculated vectors. Once a texture is moved a given distance or for a given amount of time, return is made to the initial condition, and the processing to move the texture is executed once again.

By causing the particles 14 and/or the textures applied to the polygons to move, it is possible to perceive the condition of slopes and bumps in the object surface not only from the movement of the particles 14, but also from the movement of textures.

The image processing section 7 can also be made to set the intensity of the particles 14 that are placed on the line segments. By setting the intensities of particles 14, a player is enabled to perform accurate judgment of the movement of particles 14, thereby enabling easy visual perception of the condition of the ground shape.

Additionally, the image processing section 7 can be made to set the colors of the line segments, for example making the color of line segment at high positions red and those at low positions blue, varying the color in accordance with height of the line segments. By doing this, it is possible for a player to judge the general shape of the ground by the colors, and then make a judgment of minute slopes and bumps from the speed of movement of particles 14.

Figure 5:
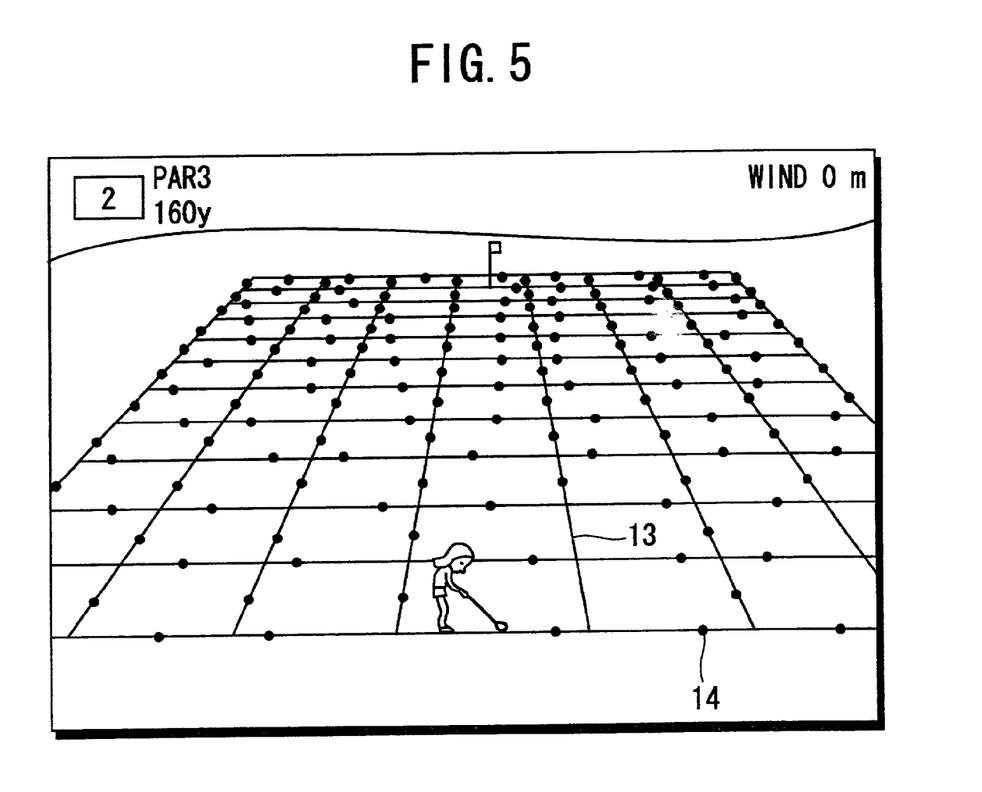
FIG. 5 is a schematic representation showing a grid display screen according to the embodiment of the present invention.
Figure 6:
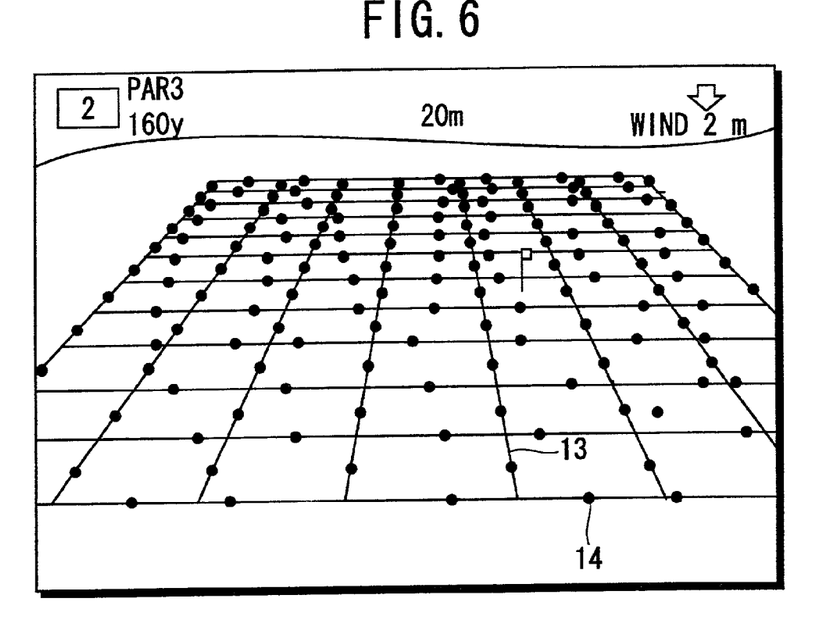
FIG. 6 is a schematic representation showing a grid display screen according to another embodiment of the present invention.
Figure 7:
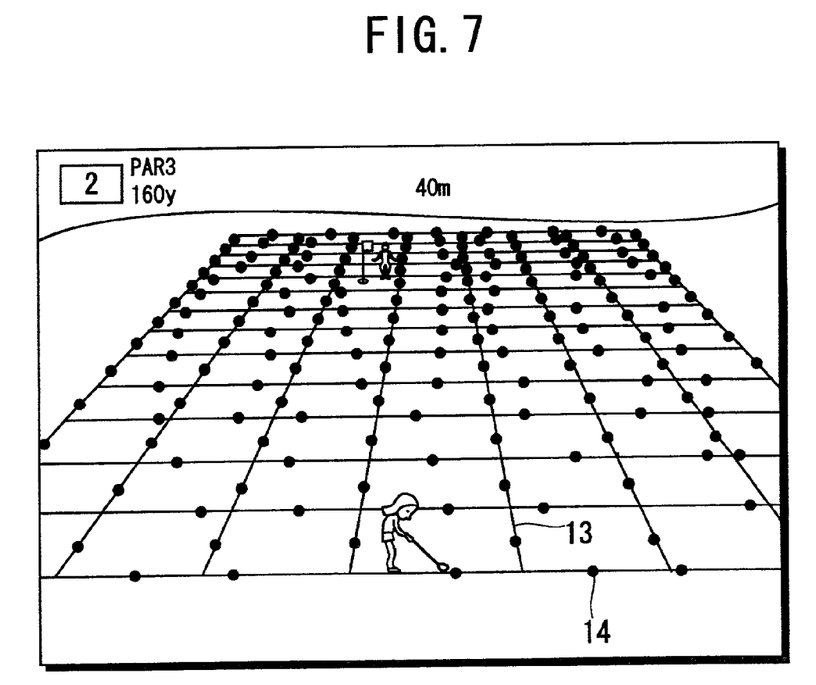
FIG. 7 is a schematic representation showing a grid display seen according to yet another embodiment of the present invention.
Figure 8:
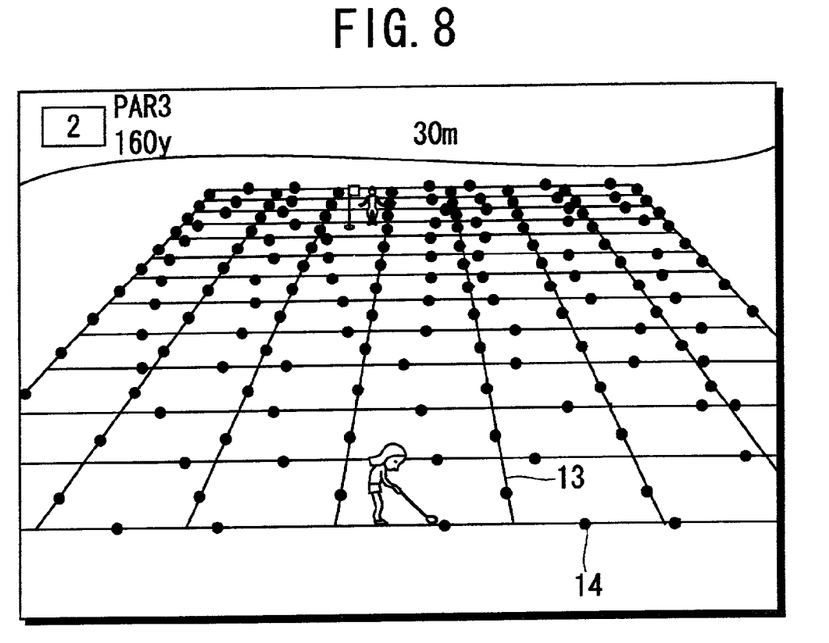
FIG. 8 is a schematic representation showing a grid display seen according to still another embodiment of the present invention.
Figure 9:
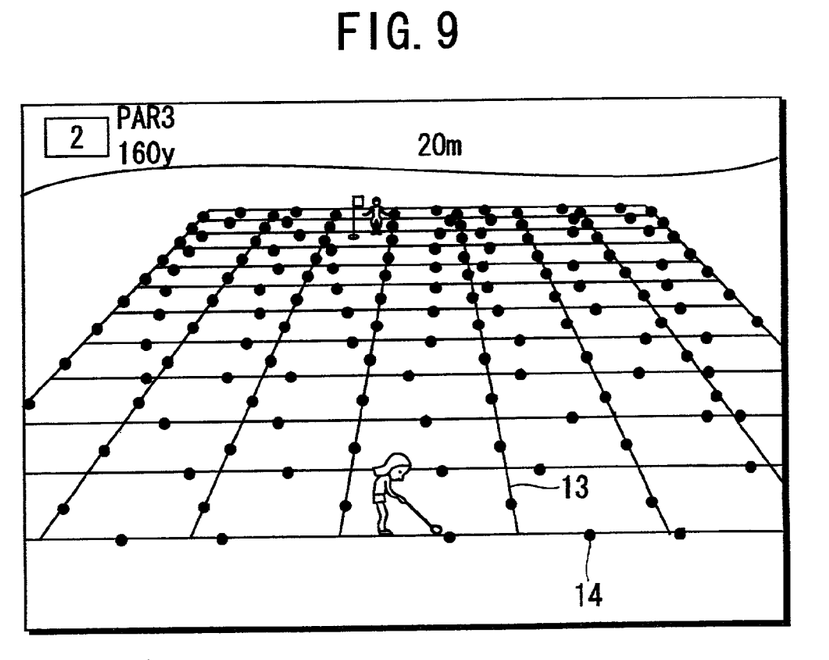
FIG. 9 is a schematic representation showing a grid display seen according to another embodiment of the present invention.
Figure 10:
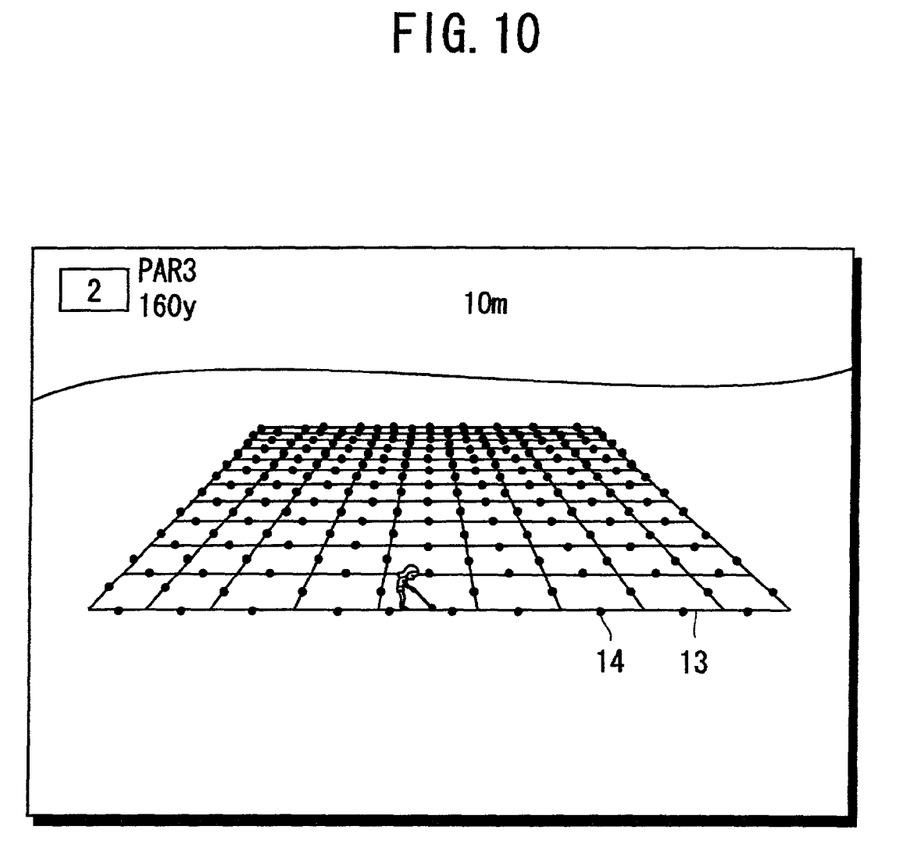
FIG. 10 is a schematic representation showing a grid display seen according to another embodiment of the present invention.

Rendering is done in the above-noted processing by varying the spacing and number of grid lines in accordance with the playing conditions of the player such as the direction of viewing of the player, the direction in which the golf ball is hit, the type of club used and the distance from the golf ball to the hole. For example, FIG. 5 shows a the grid display screen appearing on the monitor apparatus 6 when a character is putting on a green, in which case if the player operates the controller 2 so as to look the green from upward, thereby inputting an operation input signal, in the processing of step S1, for example as shown in FIG. 6, grid lines are generated in accordance with the viewing direction specified by the player and, under this condition, the direction and speed of movement of particles on the grid lines changes to match the viewing direction. By doing this, the player is able to perceive the shape of the ground from various angles, and can use this in playing the game of golf.

FIG. 7 to FIG. 10 show the grid display screens displayed on the monitor apparatus 6 when the distance from the golf ball to the hole is 40, 30, 20, and 10 meters respectively, as can be seen from these drawings, the spacing between grid lines and the number of grid lines are varied in accordance with the remaining distance, so that the player can perceive the general condition of the ground shape in the direction in which the ball is to be struck, from the grid line spacing and number of gridlines. Because the speed of particles moving on the grid lines is also varied depending upon the grid line position, it is possible for the player to perceive minute slopes and bumps in the green.

Although in the foregoing embodiment of the present invention, the grid lines form rectangles, it will be understood that this is not a restriction, and that the grid lines can be established so as to form triangles or other non-rectangular shapes. In the above-noted embodiment, the grid lines are generated by joining points of point group 12 obtained by projecting a point group 10 onto the object surface 11 by line segments 13, it is alternatively possible to generate these by directly applying grid lines having substantially uniform spacing onto the object surface.

The operation of the above-described entertainment apparatus can be stored as a program in a storage medium from which it can be read into a computer. When executing the image processing, the storage medium is read into the computer system, and the program is stored in a storage section such as a memory within the computer system, this program being executed by an execution apparatus so as to achieve the operation of the above-noted entertainment apparatus. The term storage medium used in this case refers to a computer readable storage medium, such as semiconductor memory, a magnetic disk, an optical disk, a magneto-optic disk, or a magnetic tape or the like.

As is clear from the foregoing detailed description of the present invention, when a player plays a golf game, the above-noted entertainment apparatus 1 renders grid lines on an object surface that forms the ground surface, and causes particles 14 to move on the grid lines at speed that are responsive to the degree of slope and bumps in the ground surface. By doing this, visual perception of the ground surface, such as that of a green or fairway, along which a golf ball rolls, is facilitated.

The foregoing is a description of preferred embodiments of the present invention made by the inventors, and it will be understood that the foregoing language, which is a partial description of embodiments does not restrict the present invention. For example, although the above-described embodiment is for the case of applying the present invention to a golf game, it will be understood that the present invention can be applied as well to other application software (for example strategic game or town-making game). In particular, the present invention is suitable for application program that treats objects having a slope or bumps, such as a game program that the slope degree of geography plays an important roll or a program for geographical adjustment. Thus, it is obvious that there are other embodiments and operating technologies made by the inventors other than the foregoing fall within the scope of the present invention.

What is claimed is:

1. A non-transitory computer readable storage medium comprising:
   a computer-readable code for executing a method for image processing, the method comprising the steps of rendering grid lines on an object surface;
   concurrently rendering a plurality of moving indicator objects, each moving only on a respective one of the grid lines at a speed responsive to a slope angle on the object surface on which the grid lines are provided, the moving indicator objects being rendered for each spacing between lattice points of the grid lines;
   moving each of the plurality of moving indicator objects from a first corresponding lattice point at a high position to a second corresponding lattice point at a low position; and
   when each moving indicator object reaches the second corresponding lattice point at the low position, deleting the moving indicator object and rendering the moving indicator object again on the first corresponding lattice point at the high position;
   wherein the grid lines are rendered by projecting the lattice points directly onto the object surface and joining the projected lattice points by respective line segments, or by applying grid lines directly onto the object surface; and
   wherein the grid lines are rendered in accordance with a viewing direction specified by a player and in a density corresponding to the slope angle of the object surface.

2. An image processing apparatus, comprising:
   means for rendering grid lines on an object surface; and
   means for concurrently rendering a plurality of moving indicator objects, each moving concurrently only on a respective one of the grid lines at a speed responsive to a slope angle on the object surface on which the grid lines are provided, the moving indicator objects being rendered for each spacing between lattice points of the grid lines, wherein the means for rendering:
      moves each of the moving indicator objects from a first corresponding lattice point at a high position to a second corresponding lattice point at a low position, and
      when each moving indicator object reaches the second corresponding lattice point at the low position, deletes the moving indicator object and renders the moving indicator object again on the first corresponding lattice point at the high position;
   wherein the grid lines are rendered by projecting the lattice points directly onto the object surface and joining the projected lattice points by respective line segments, or by applying grid lines directly onto the object surface; and
   wherein the grid lines are rendered in accordance with a viewing direction specified by a player and in a density corresponding to the slope angle of the object surface.

3. A non-transitory computer readable storage medium, comprising:
   a computer-readable code for executing a method for image processing, the method comprising the steps of:
   rendering grid lines on an object surface;
   concurrently rendering a plurality of moving indicator objects each moving only on a respective one of the grid lines at a speed responsive to a slope angle on the object surface on which the grid lines are provided, the moving indicator objects being rendered for each spacing between lattice points of the grid lines; and
   rendering a movable object representing a golf ball, wherein the movable object does not move only on the grid lines.

4. An image processing apparatus, comprising:
   means for rendering grid lines on an object surface;
   means for concurrently rendering a plurality of moving indicator objects each moving only on a respective one of the grid lines at a speed responsive to a slope angle on the object surface on which the grid lines are provided, the moving indicator objects being rendered for each spacing between lattice points of the grid lines; and
   means for rendering a movable object representing a golf ball, wherein the movable object does not move only along the grid lines.

* * * * *